Sept. 27, 1932.     G. C. McCAULEY ET AL     1,880,021
ACCESSORY UNIT FOR DOMESTIC FREEZING APPARATUS
Filed Dec. 13, 1930
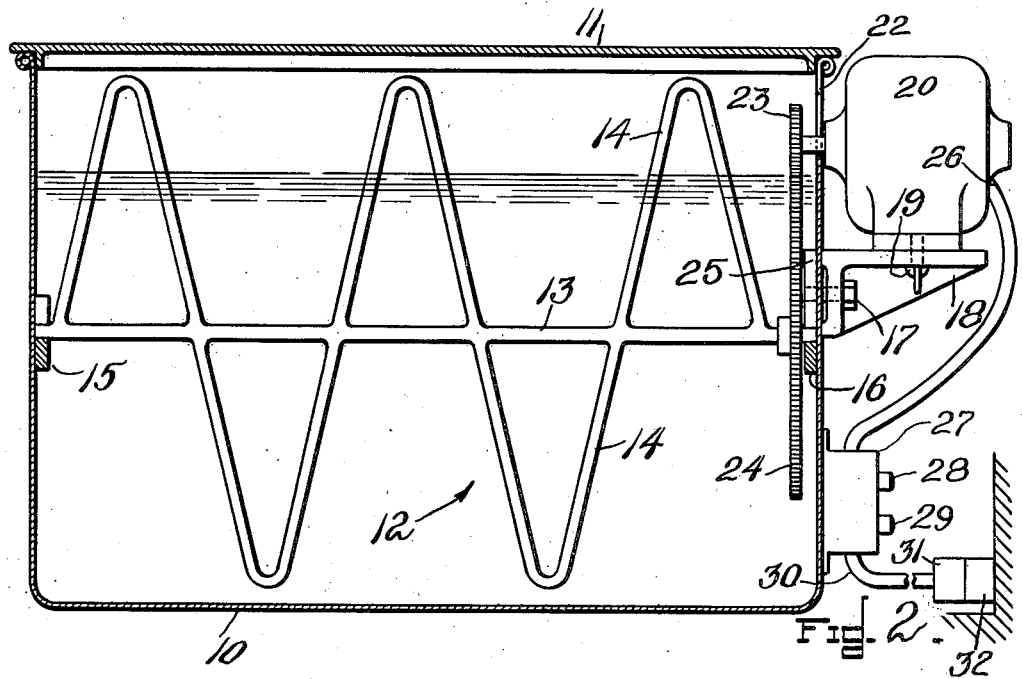
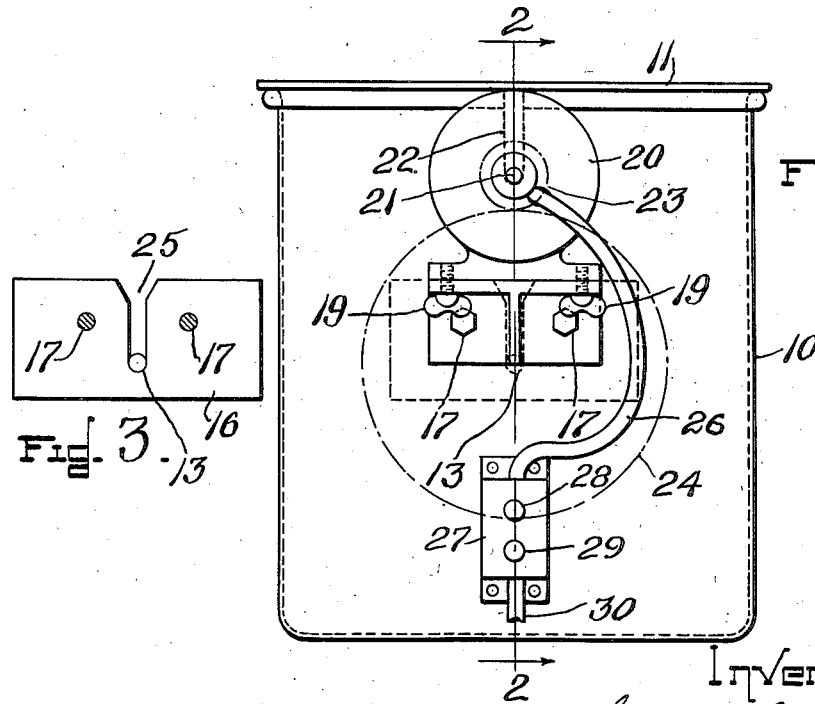
Inventors
Gordon C. McCauley and
Joseph Lewis Hallett
By Arthur F. Randall atty.

Patented Sept. 27, 1932

1,880,021

UNITED STATES PATENT OFFICE

GORDON C. McCAULEY, OF BOSTON, AND JOSEPH LEWIS HALLETT, OF BRAINTREE, MASSACHUSETTS

ACCESSORY UNIT FOR DOMESTIC FREEZING APPARATUS

Application filed December 13, 1930. Serial No. 502,174.

Our invention relates to apparatus for use in freezing ice-cream and the like and it has for its object to provide, as a new article of manufacture, an accessory or supplemental unit for use in connection with automatic domestic refrigerating apparatus by means of which ice-cream and the like can be produced expeditiously and conveniently, and of better quality, than has been possible with the means and methods heretofore employed in connection with refrigerating apparatus of the class referred to.

Heretofore, in using an automatic domestic refrigerating unit or apparatus to make ice-cream and the like, it has been the practice to place the ice-cream mix within a suitable container; to place the container thus loaded within the refrigerating unit or apparatus, and to leave the same inclosed within the latter until the mix was frozen, said mix being manually stirred or agitated at irregular intervals by means of a spoon or the like in order to prevent or retard the formation of ice or crystals. This stirring or agitating, however, did not wholly prevent the formation of ice or crystals with the result that an objectionable quantity of the latter would exist in the frozen product.

Our invention provides a small, portable, self-contained accessory or supplemental unit for automatic refrigerating apparatus adapted to be manually placed within the latter and to be used for making ice-cream and the like, or to be removed from said apparatus and stored in another place, if desired, while it is not being so used.

This accessory unit comprises a container for holding a quantity of mix within which container is rotatably supported an agitator provided with driving means that is mounted upon said container and by which power is applied to said agitator to turn or rotate the same, said means being operable, or operating automatically, to actuate said agitator while said container is inclosed by said refrigerating apparatus and its contents is not directly accessible. In the best form of our invention the said driving means includes a motor, preferably an electric motor, mounted upon said container and operating to continuously actuate the agitator while the accessory unit is in use. It is also a feature of our invention in its best form, that means is provided for automatically relieving the motor of overload when the mixture is frozen to a stiffness such as to impose an excess load upon the motor.

Other features of our invention, including the herein illustrated construction and arrangement of parts, are hereinafter pointed out.

In the accompanying drawing:

Figure 1 is an end elevation of an accessory unit, such as described above, which is constructed in accordance with our invention.

Figure 2 is a section on line 2—2 of Fig. 1.

Figure 3 is a detail hereinafter described.

The illustrated embodiment of our invention comprises a sheet metal container 10 provided with a removable cover 11 and within this container is arranged a rotatable agitator that is indicated generally at 12.

The agitator 12 comprises a shaft 13 provided at opposite sides thereof with radially disposed vanes or arms 14, said shaft being journaled at its opposite ends in bearings 15 and 16, respectively. The bearing 15 is welded or otherwise rigidly fixed in position upon the inner side of one of the end walls of container 10, while the bearing 16 may be a metal plate fastened by a pair of screws 17 to the inner side of the opposite end wall of the container.

The two screws 17 also serve to fasten a shelf-bracket 18 in position against the outer face of the last mentioned end wall of the container, and on this shelf-bracket is removably secured, as by means of thumb-screws 19, an electric motor 20 whose armature shaft 21 is extended at one end through a slot 22 provided in the adjacent wall of the container to the interior of the latter where it is provided with a pinion 23.

This pinion 23 is in mesh with a gear 24 fast on shaft 13 near one end thereof.

It will thus be clear that when motor 20 is in operation it acts through pinion 23 and gear 24 to automatically rotate the agitator 12, of which gear 24 forms part, continuously in one direction thereby effectively agitating the mix within the container so as to prevent the formation of crystals or ice and with the result that the frozen product is a smooth homogeneous mass.

The end of the shaft 13 that is adjacent the gear 24 normally rests at the bottom of a vertical slot 25 formed in bearing plate 16 and is held against displacement upwardly in the slot 25 by pinion 23.

When it is desired to remove the contents of the container, or to clean the interior of the latter, the motor 20 is disconnected from shelf-bracket 18 by removing screws 19 and then the motor is removed from the shelf after which the agitator 12 may be lifted out of the container 10.

The circuit wires of motor 20 are arranged in a flexible cable 26 connected with a free tripping overload switch 27 which, in turn is connected by a flexible cable 30 of circuit wires and a separable coupling terminal 31 with a coupling fixture 32 which may be mounted upon one of the walls of the freezing compartment of the refrigerating apparatus within which the unit is used. This coupling fixture is connected with a source of current supply.

The overload switch 27 may be of any suitable or standard type and, as usual, is provided with a starting push-button 28 and a stopping push-button 29.

In using our new unit the container 10 is filled with mix and placed within the freezing compartment of the refrigerating apparatus. Then, after connecting the coupling members 31 and 32, the push-button 28 is operated to start the motor after which the door of the compartment is closed.

Thereafter the motor continuously drives the agitator 12 until the mix is frozen to a stiffness sufficient to overload motor 20 to the point where the switch 27 operates automatically to cut off the power supplied to the motor through cable 26.

Thus the use of our new unit not only obviates the formation of the ice and crystals referred to, but it also reduces to a minimum the amount of labor and attention required in utilizing an automatic domestic refrigerator or refrigerating apparatus to freeze ice cream and the like.

What we claim is:

As a new article of manufacture, a portable self-contained mix-holding accessory unit for insertion within the freezing compartment of an automatic domestic freezing apparatus, said unit comprising a container comprising a bottom wall, two side walls, and two end walls; a closure lid removably fitted to the tops of said side and end walls, an agitator element within and removably supported by said container so as to turn on a horizontal axis; an electric motor for driving said element, said motor being disposed upon the exterior of said container opposite one of said end walls and below the level of the top of said closure lid; means separably and positively fastening said motor to said container; and a power transmitting mechanism connecting said agitator element with the armature shaft of said motor by which said agitator element is held in position within said container but so that removal of said motor permits of removal of said agitator element from said container.

Signed by us at Boston, Suffolk County, Massachusetts, this 9th day of December, 1930.

GORDON C. McCAULEY.
JOSEPH LEWIS HALLETT.